June 9, 1931. H. JUNKERS 1,809,168
TOOL FOR UPSETTING OR STRETCHING SHEET METAL
Filed Dec. 12, 1929   2 Sheets-Sheet 2

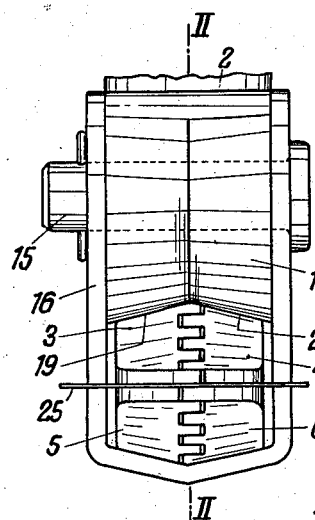
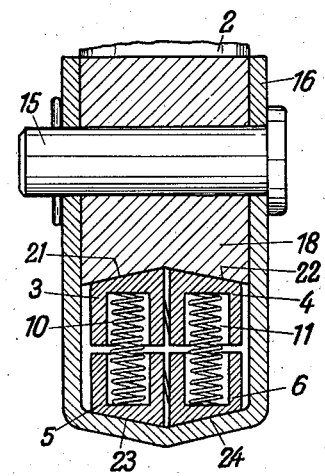
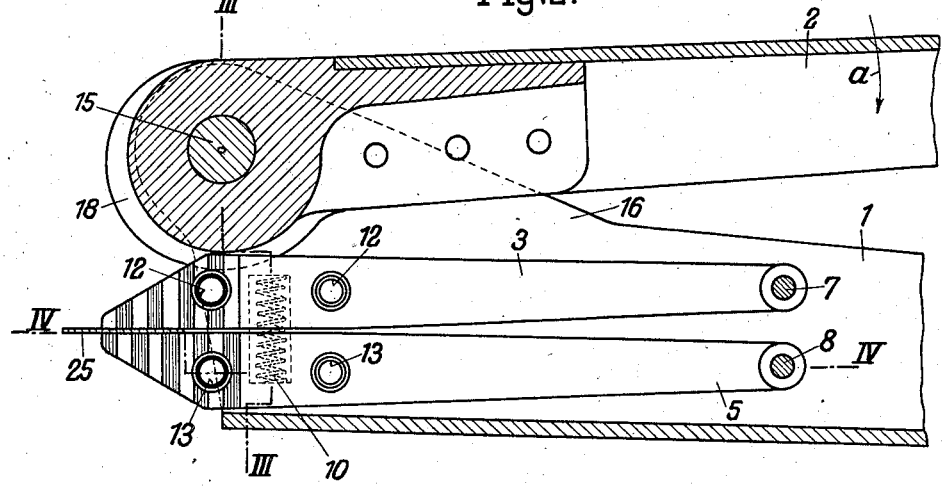

Inventor:
Hugo Junkers

Patented June 9, 1931

1,809,168

UNITED STATES PATENT OFFICE

HUGO JUNKERS, OF DESSAU, GERMANY

TOOL FOR UPSETTING OR STRETCHING SHEET METAL

Application filed December 12, 1929, Serial No. 413,604, and in Germany December 18, 1928.

My invention relates to a tool for upsetting or stretching sheet metal and more particularly to a tool of the kind described in my copending application for patent, Serial No. 47,816, filed August 3, 1925. A tool of this kind comprises two pairs of gripping jaws which are movable towards and away from each other, and a single means for first closing the jaws of each pair and thereafter displacing the jaws of the pairs with respect to each other, that is, reducing or increasing their pitch so as to upset or stretch the workpiece.

It is an object of my invention to provide a handy tool to replace the device or machine described in my said copending application, which tool allows not only upsetting or stretching an independent piece of sheet metal in the manner described in my said copending application, but also pieces of sheet metal forming parts of finished units.

To this end I design the tool after the manner of tongs, with the pairs of jaws arranged on one of the arms or handles of the tongs, while the other arm or handle is equipped with camming means for exerting pressure on the jaws. The camming means engage one pair of jaws and are designed to first cause a gripping movement of the jaws by approaching the two pairs, and to then displace the jaws of each pair with respect to each other so that the gripped piece of sheet metal is upset or stretched.

In a preferred embodiment of my invention I arrange the jaws within one of the arms or handles of the tongs in such manner that the jaws of each pair, or extensions of the jaws, are fitted to rock about a pin in the arm or handle. Springs are provided for returning the jaws into their initial position, after they have performed their gripping and upsetting or stretching movements as soon as the pressure of the camming means is relieved.

As described in my said copending application, the jaws, the camming means and a part against which the jaws not engaged by the camming means abut are provided with inclined faces which may be converging toward or diverging away from the central plane between the jaws of each pair. It will be understood that upon operation of the camming means these inclined faces will cause the jaws in each pair to approach or to recede from each other simultaneously, at the same time upsetting or stretching the workpiece. In the case of an upsetting tool the springs which return the jaws into initial position are compression springs, in the case of a stretching tool they are tension springs.

Figure 4:
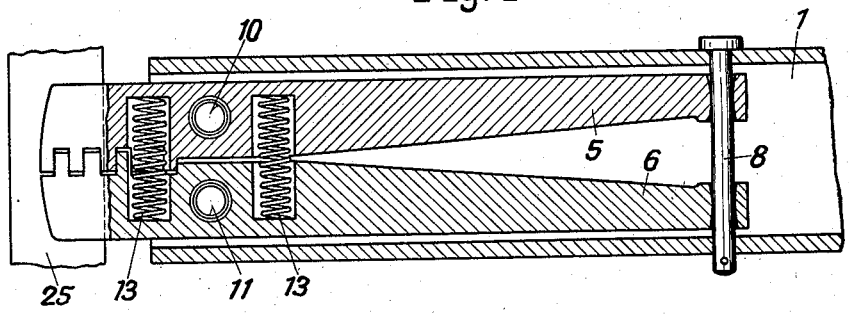
Figure 5:
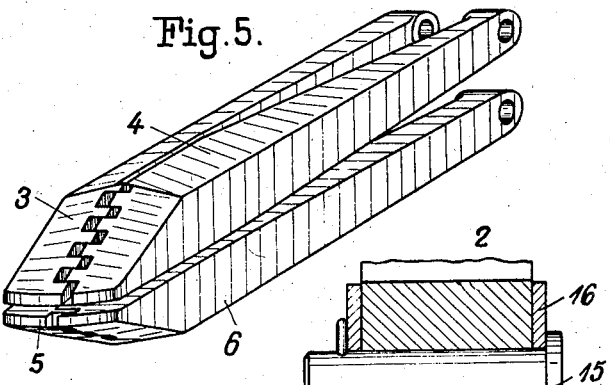
Figure 6:
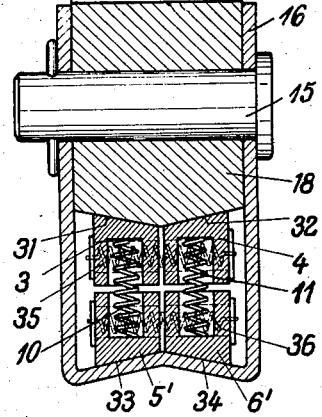

In the drawings affixed to this specification and forming part thereof an upsetting tool embodying my invention is illustrated diagrammatically in Figs. 1 to 5, while part of a stretching tool is illustrated diagrammatically in Fig. 6 by way of example.

In the drawings

Fig. 1 is an end elevation of the upsetting tool with its upper arm or handle partly broken away, Fig. 2 is a section on the line II—II in Fig. 1, Fig. 3 is a section on the line III—III in Fig. 1, Fig. 4 is a section on the line IV—IV in Fig. 2, Fig. 5 is a perspective illustration showing the two pairs of jaws, and Fig. 6 is a section similar to Fig. 3, but showing a stretching tool.

Referring to the drawings and first to Figs. 1 and 2, the tool comprises two arms or handles 1 and 2 which are shown as having channel section, 16 is a bracket at the front end of the arm 1 which embraces a cam 18 at the end of the handle 2, and 15 is a bolt enabling the cam 18 to rotate in the extension 16. 3, 4 and 5, 6 are pairs of upper and lower jaws which are inserted in the arm 1, so as to project from the front end of the bracket 16. Each jaw is provided with a rearward extension and is fitted with this extension to rock about a pin 7 (for the upper pair 3, 4) and a pin 8 (for the lower pair 5, 6), the eyes of the extensions having spherical holes, as shown in Fig. 4, so as not to interfere with the transverse displacement of the jaws.

The mating faces in each pair of jaws are serrated as and for the purpose described in my said copending application.

With the jaws arranged as described, that is, each jaw resembling a lever which is fulcrumed in the arm 1 and projects from it with its jaw end, and the ends of the jaws gripping and acting upon the piece 25, the application of the tool is greatly facilitated, particularly if the piece to be gripped and acted upon is in a position, in which it would be accessible only with difficulty or not accessible at all to the machine or device described in my said copending application.

Vertical compression springs 10, 11 are inserted between the pairs of jaws which tend to move the jaws apart against their gripping action under the influence of the cam 18, and 12, 13 are pairs of horizontal compression springs inserted between the jaws of each pair, as shown (for the lower pair 56) in Fig. 4. These springs tend to move the jaws apart horizontally after they have been moved toward each other for upsetting the piece 25 under the action of the inclined faces.

As mentioned above the cam 18 at the end of the arm 2 is fitted to rock about a pin 15 in a bracket 16 at the end of the arm 1. The jaws 3, 4 of the upper pair are equipped with inclined camming faces 19 and 20, (Fig. 1) and the cam 18 is equipped with corresponding faces 21 and 22, (Fig. 3), the faces in a compression tool converging toward the central plane of the cam 18. By the reaction of the vertical springs 10 and 11 the faces 21 and 22 of the jaws 3, 4 are held engaged with the faces of the cam 18, and when the arm 2 is rotated about the pin 15, as indicated by the arrow a in Fig. 2, the jaws will be closed so as to grip the piece 25. Thereupon, in consequence of the inclination of the faces 19, 21 and 20, 22, the jaws of the upper pair will be moved closer together so that the piece 25 which has been gripped, is upset. The lower pair of jaws 5, 6 partakes in this displacement, being equipped with inclined faces 23, 24 which are similar to the faces of the upper pair and slide on corresponding faces at the bottom of the bracket 16. In this manner the jaws of the upper and lower pairs are moved in unison for upsetting the piece 25. When the arm 2 is released the jaws are returned into their initial position by the springs 10, 11 and 12, 13.

Fig. 6 illustrates a stretching tool which is similar to the tool illustrated in Figs. 1 to 5, with two pairs of jaws pivotally carried in the lower arm 1 and equipped with vertical compression springs 10, 11, but here the inclined faces 31 and 32 of the cam 18 and of the upper pair 3, 4 of jaws are inclined so as to diverge from the central plane of the cam 18, and so are the faces 33, 34 of the lower pair 5, 6 and of the bracket 16. The horizontal springs between the jaws of each pair are tension springs 35 in the upper pair and 36 in the lower pair.

With the inclined camming faces arranged in this manner the jaws of each pair, upon operation of the cam 18, as described, will grip the piece 25 as before, but will be moved apart by the camming action of the inclined faces, so that the part is stretched instead of being upset. When the jaws are released by the cam 18 the springs 10 and 11 act as described with reference to Figs. 1 to 5, while the springs 35, 36 pull the jaws together and into their initial position.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. A tool for producing a change of form in sheet metal comprising two pairs of jaws, camming faces inclined in opposite directions on the jaws of each pair and camming means adapted to cooperate with said camming faces, said camming means comprising a pair of pivotally connected arms, means on one of said arms, about which said pairs of jaws are fitted to rock, said camming means being arranged on the other arm so as to cooperate with the camming faces of the adjacent pair of jaws, and faces on said first-mentioned arm on which the camming faces of the other pair of jaws are fitted to slide.

2. A tool for producing a change of form in sheet metal comprising two pairs of jaws, camming faces inclined in opposite directions on the jaws of each pair and camming means adapted to cooperate with said camming faces, said camming means comprising a pair of pivotally connected arms, a pair of pins in one of said arms, each pin supporting one pair of said jaws, said camming means being arranged on the other arm so as to cooperate with the camming faces of the adjacent pair of jaws, and faces on said first-mentioned arm on which the camming faces of the other pair of jaws are fitted to slide.

3. A tool for producing a change of form in sheet metal comprising two pairs of jaws, camming faces inclined in opposite directions on the jaws of each pair and camming means adapted to cooperate with said camming faces, said camming means comprising a pair of pivotally connected arms, a pair of pins in one of said arms, spherical eyes on said jaws, the eyes of each pair of jaws being seated on one of said pins, said camming means being arranged on the other arm so as to cooperate with the camming faces of the adjacent pair of jaws, and faces on said first-mentioned arm on which the camming faces of the other pair of jaws are fitted to slide.

4. A tool for producing a change of form in sheet metal comprising two pairs of jaws, camming faces inclined in opposite directions on the jaws of each pair and camming means adapted to cooperate with said camming faces, said camming means comprising a pair of pivotally connected arms, means on one of said arms, about which said pairs of jaws are fitted to rock with their operating faces projecting from the front end of said tool, said camming means being arranged on the other arm so as to cooperate with the camming faces of the adjacent pair of jaws, and faces on said first-mentioned arm on which the camming faces of the other pair of jaws are fitted to slide.

5. A tool for producing a change of form in sheet metal comprising two pairs of jaws, camming faces inclined in opposite directions on the jaws of each pair and camming means adapted to cooperate with said camming faces, said camming means comprising a pair of pivotally connected arms, means on one of said arms, about which said pairs of jaws are fitted to rock, said camming means being arranged on the other arm so as to cooperate with the camming faces of the adjacent pair of jaws, faces on said first-mentioned arm on which the camming faces of the other pair of jaws are fitted to slide, and springs operatively connected with said jaws for returning them into initial position.

In testimony whereof I affix my signature.

HUGO JUNKERS.